(12) United States Patent
Zhang et al.

(10) Patent No.: US 11,812,008 B2
(45) Date of Patent: Nov. 7, 2023

(54) VR IMAGE PROCESSING METHOD AND DEVICE, VR GLASSES, AND READABLE STORAGE MEDIUM

(71) Applicant: GOERTEK INC., Shandong (CN)

(72) Inventors: Xiangjun Zhang, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 138 days.

(21) Appl. No.: 17/602,841

(22) PCT Filed: Dec. 31, 2019

(86) PCT No.: PCT/CN2019/130345
§ 371 (c)(1),
(2) Date: Oct. 11, 2021

(87) PCT Pub. No.: WO2021/103267
PCT Pub. Date: Jun. 3, 2021

(65) Prior Publication Data
US 2022/0150459 A1 May 12, 2022

(30) Foreign Application Priority Data
Nov. 28, 2019 (CN) .......................... 201911193057.7

(51) Int. Cl.
*H04N 13/156* (2018.01)
*H04N 13/117* (2018.01)
(Continued)

(52) U.S. Cl.
CPC ............. *H04N 13/156* (2018.05); *G06T 7/60* (2013.01); *G06V 10/759* (2022.01);
(Continued)

(58) Field of Classification Search
None
See application file for complete search history.

(56) References Cited

U.S. PATENT DOCUMENTS

| 5,488,508 A | 1/1996 | Haseltine |
| 6,351,262 B1 | 2/2002 | Edmark |

(Continued)

FOREIGN PATENT DOCUMENTS

| CN | 101895779 | 11/2010 |
| CN | 105723705 | 6/2016 |

(Continued)

OTHER PUBLICATIONS

Yang Chunde, et al., "Fast image mosaic algorithm based on adaptive elimination of stitching seam and panorama alignment", Journal of Computer Applications, 2019.
(Continued)

*Primary Examiner* — Xiaolan Xu
(74) *Attorney, Agent, or Firm* — HAUPTMAN HAM, LLP

(57) ABSTRACT

Provided are VR image processing method and apparatus. The method includes: rendering left-eye and right-eye viewpoint regions based on left-eye and right-eye view angles respectively, to obtain left-eye and right-eye viewpoint images; determining a candidate region based on positions of the left-eye and right-eye view angles, and selecting a point in the candidate region as a peripheral image view angle; rendering left-eye and right-eye viewpoint peripheral regions based on the peripheral image view angle, to obtain a same viewpoint peripheral image; and splicing the viewpoint peripheral image with the left-eye viewpoint image and with the right-eye viewpoint image to obtain a left-eye complete image and a right-eye complete image.

13 Claims, 8 Drawing Sheets

(51) Int. Cl.
*H04N 13/344* (2018.01)
*H04N 13/139* (2018.01)
*H04N 13/122* (2018.01)
*G06V 10/75* (2022.01)
*G06T 7/60* (2017.01)

(52) U.S. Cl.
CPC ......... *H04N 13/117* (2018.05); *H04N 13/122* (2018.05); *H04N 13/139* (2018.05); *H04N 13/344* (2018.05); *G06T 2207/10012* (2013.01)

(56) References Cited

U.S. PATENT DOCUMENTS

| | | |
|---|---|---|
| 2016/0295200 A1 | 10/2016 | Bruls |
| 2017/0236466 A1 | 8/2017 | Spitzer et al. |
| 2018/0137598 A1 | 5/2018 | Spitzer et al. |
| 2021/0209998 A1 | 6/2021 | Wang et al. |

FOREIGN PATENT DOCUMENTS

| | | | |
|---|---|---|---|
| CN | 107067371 | | 8/2017 |
| CN | 108665805 | | 10/2018 |
| CN | 109074774 | | 12/2018 |
| CN | 109739460 | | 5/2019 |
| CN | 109739460 A | * | 5/2019 |
| CN | 109741289 | | 5/2019 |
| CN | 109844850 | | 6/2019 |
| CN | 110324601 | | 10/2019 |
| WO | WO2019184251 | | 10/2019 |

OTHER PUBLICATIONS

International Search Report issued in PCT/CN2019/130345 dated Aug. 28, 2020.

* cited by examiner

1

VR IMAGE PROCESSING METHOD AND DEVICE, VR GLASSES, AND READABLE STORAGE MEDIUM

This application is 371 application of International Patent Application No. PCT/CN2019/130345, titled "VR IMAGE PROCESSING METHOD AND DEVICE, VR GLASSES, AND READABLE STORAGE MEDIUM", filed on Dec. 31, 2019, which claims the benefit of and priority to Chinese Patent Application No. 201911193057.7, titled "VR IMAGE PROCESSING METHOD AND DEVICE, VR GLASSES, AND READABLE STORAGE MEDIUM", filed on Nov. 28, 2019 with the China National Intellectual Property Administration (CNIPA), which are incorporated herein by reference in their entirety.

FIELD

The present disclosure relates to the technical field of VR imaging, and in particular to a VR image processing method, a VR image processing device, VR glasses and a readable storage medium.

BACKGROUND

For the conventional VR images, in order to create a visual stereoscopic effect, it is required to render one group of images for each of a left eye and a right eye. However, a large amount of computation is required for rendering the two groups of images simultaneously, which indicates a long time delay and a low frame rate under a limited computation capability of a conventional VR device, and thus brings a vertiginous sensation to a wearer.

Therefore, how to reduce the amount of image data to be rendered as much as possible without affecting the stereoscopic effect, so as to shorten a time delay, increase a frame rate and relieve a vertiginous sensation, is a problem to be solved urgently for those skilled in the art.

SUMMARY

A VR image processing method, a VR image processing device, VR glasses and a readable storage medium are provided according to the present disclosure to reduce the amount of image data to be rendered as much as possible without affecting the stereoscopic effect of a VR image, so as to shorten a time delay, increase a frame rate and relieve a vertiginous sensation.

In order to realize the above objectives, a VR image processing method is provided according to the present disclosure. The method includes:
  rendering a left-eye viewpoint region based on a left-eye view angle, to obtain a left-eye viewpoint image;
  rendering a right-eye viewpoint region based on a right-eye view angle, to obtain a right-eye viewpoint image;
  determining a candidate region based on positions of the left-eye view angle and the right-eye view angle, and selecting a point in the candidate region as a peripheral image view angle;
  rendering a left-eye viewpoint peripheral region and a right-eye viewpoint peripheral region based on the peripheral image view angle, to obtain a same viewpoint peripheral image; and
  splicing the viewpoint peripheral image with the left-eye viewpoint image to obtain a left-eye complete image, and splicing the viewpoint peripheral image with the right-eye viewpoint image to obtain a right-eye complete image.

In an embodiment, the determining a candidate region based on positions of the left-eye view angle and the right-eye view angle includes:
  connecting the left-eye view angle and the right-eye view angle through a straight line; and
  making a circle centered as a midpoint of the straight line and having a preset radius, to obtain a circular candidate region, where the preset radius is not greater than half of a length of the straight line.

In an embodiment, in a case that the candidate region is the circular candidate region, the selecting a point in the candidate region as a peripheral image view angle includes:
  determining a center of the circular candidate region as the peripheral image view angle.

In an embodiment, a resolution of the viewpoint peripheral image is lower than a resolution of the left-eye viewpoint image and is lower than a resolution of the right-eye viewpoint image.

In an embodiment, the VR image processing method further includes:
  determining a transition image view angle based on the left-eye view angle and the right-eye view angle; and
  rendering a left-eye transition region based on the transition image view angle to obtain a left-eye transition image, and rendering a right-eye transition region based on the transition image view angle to obtain a right-eye transition image, where:
  the left-eye transition region surrounds an outer boundary of the left-eye viewpoint region, and the left-eye viewpoint peripheral region surrounds an outer boundary of the left-eye transition region,
  the right-eye transition region surrounds an outer boundary of the right-eye viewpoint region, and the right-eye viewpoint peripheral region surrounds an outer boundary of the right-eye transition region;
  a resolution of the left-eye transition image is lower than a resolution of the left-eye viewpoint image and is higher than a resolution of the left-eye viewpoint peripheral image, and
  a resolution of the right-eye transition image is lower than a resolution of the right-eye viewpoint image and is higher than a resolution of the right-eye viewpoint peripheral image.

In an embodiment, the determining a transition image view angle based on the left-eye view angle and the right-eye view angle includes:
  determining a midpoint of a straight line connecting the left-eye view angle and the right-eye view angle as a central view angle;
  determining a midpoint of the left-eye view angle and the central view angle as a first left-eye transition image view angle; and
  determining a midpoint of the right-eye view angle and the central view angle as a first right-eye transition image view angle.

In an embodiment, the determining a transition image view angle based on the left-eye view angle and the right-eye view angle includes:
  determining a midpoint of a straight line connecting the left-eye view angle and the right-eye view angle as a second left-eye transition image view angle and as a second right-eye transition image view angle.

In an embodiment, the VR image processing method further includes:

performing image optimization processing on a splice of images of different regions with a weight change method or a feature point fitting method.

In an embodiment, the performing image optimization processing on a splice of images of different regions with a weight change method includes:

calculating an image parameter of each pixel of an image of a transition region according the following equation:

$$A = W*x + G*(1-x),$$

where A represents any one of pixels of the image of the transition region, W represents the viewpoint peripheral image, G represents the image of the transition region, x represents a weight and gradually changes from 1 to 0 with an increase of a distance between A and an inner edge of the transition region.

In an embodiment, the performing image optimization processing on a splice of images of different regions with a feature point fitting method includes:

determining a splicing overlapping region of a viewpoint image and a transition image;

selecting, as a standard image, a part of the viewpoint image which is located in the splicing overlapping region;

selecting, as a transformation image, a part of the transition image which is located in the splicing overlapping region;

extracting a matching feature point between the standard image and the transformation image; and adjusting the transformation image based on the matching feature point, so that the adjusted transformation image has more matching feature points with the standard image.

In order to realize the above objectives, a VR image processing device is further provided according to the present disclosure. The VR image processing device includes:

a left-eye viewpoint image acquisition unit, configured to render a left-eye viewpoint region based on a left-eye view angle, to obtain a left-eye viewpoint image;

a right-eye viewpoint image acquisition unit, configured to render a right-eye viewpoint region based on a right-eye view angle, to obtain a right-eye viewpoint image;

a peripheral image view angle selection unit, configured to determine a candidate region based on positions of the left-eye view angle and the right-eye view angle, and select a point in the candidate region as a peripheral image view angle;

a viewpoint peripheral image acquisition unit, configured to render a left-eye viewpoint peripheral region and a right-eye viewpoint peripheral region based on the peripheral image view angle, to obtain a same viewpoint peripheral image;

an image splicing unit, configured to splice the viewpoint peripheral image with the left-eye viewpoint image to obtain a left-eye complete image, and splice the viewpoint peripheral image with the right-eye viewpoint image to obtain a right-eye complete image; and an area adjustment unit, configured to reduce, when a displacement of a left-eye viewpoint or a right-eye viewpoint within a preset time period is less than a preset displacement, an area of a corresponding viewpoint region and increase an area of a corresponding viewpoint peripheral region.

In order to realize the above objectives, VR glasses are provided according to the present disclosure. The VR glasses include:

a memory, configured to store a computer program; and a processor, configured to execute the computer program to implement steps of the VR image processing method described above.

In order to realize the above objectives, a readable storage medium is further provided according to the present disclosure. The readable storage medium stores a computer program that, when being called and executed by a processor, performs steps of the VR image processing method described above.

The VR image processing method according to the present disclosure includes: rendering a left-eye viewpoint region based on a left-eye view angle, to obtain a left-eye viewpoint image; rendering a right-eye viewpoint region based on a right-eye view angle, to obtain a right-eye viewpoint image; determining a candidate region based on positions of the left-eye view angle and the right-eye view angle, and selecting a point in the candidate region as a peripheral image view angle; rendering a left-eye viewpoint peripheral region and a right-eye viewpoint peripheral region based on the peripheral image view angle, to obtain a same viewpoint peripheral image; splicing the viewpoint peripheral image with the left-eye viewpoint image to obtain a left-eye complete image, and splicing the viewpoint peripheral image with the right-eye viewpoint image to obtain a right-eye complete image.

Apparently, different from the conventional technology, in the present disclosure, a unique peripheral image view angle is determined for viewpoint peripheral regions based on a left-eye viewpoint and a right-eye viewpoint, and a unique group of viewpoint peripheral images is obtained by rendering based on the peripheral image view angle. That is, the left-eye complete image and the right-eye complete image are obtained by splicing different viewpoint images with the same viewpoint peripheral image respectively. Images of the viewpoint peripheral regions are relatively far from the viewpoints, thus the difference of the images of the viewpoint peripheral regions in size hardly affects the creating of stereoscopic effect and VR viewing experience of the user. Therefore, the amount of data that is required to be rendered can be significantly reduced without affecting the VR viewing experience, thereby shortening the time delay, improving the frame rate and relieving the vertiginous sensation.

A VR image processing device, VR glasses and a readable storage medium are further provided according to the present disclosure. The VR image processing device, the VR glasses and the readable storage medium also have the beneficial effects described above, which are not repeated herein.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings based on the provided drawings without any creative effort.

DETAILED DESCRIPTION OF EMBODIMENTS

A VR image processing method, a VR image processing device, VR glasses and a readable storage medium are provided according to the present disclosure to reduce the amount of image data to be rendered as much as possible without affecting a stereoscopic effect of a VR image, so as to shorten a time delay, increase a frame rate and relieve a vertiginous sensation.

In order to make objectives, technical solutions and advantages of embodiments of the present disclosure clear, technical solutions of the embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
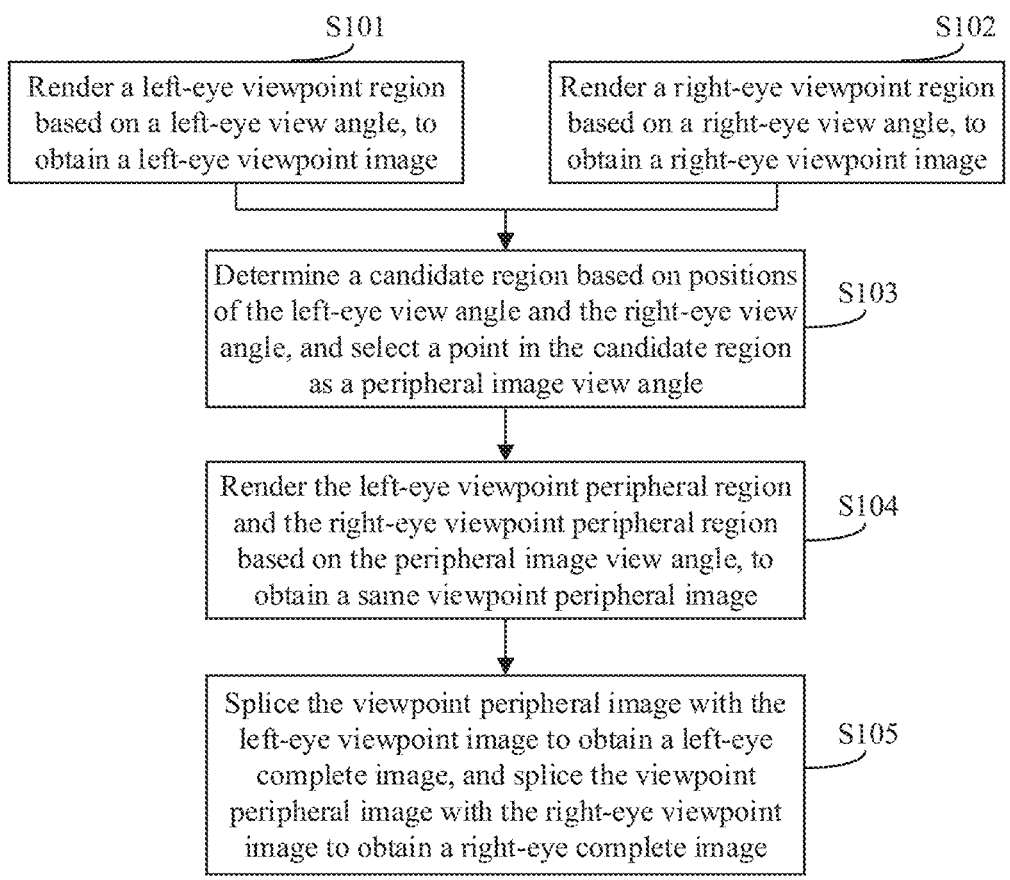
FIG. 1 is a flowchart of a VR image processing method according to an embodiment of the present disclosure.

Reference is made to FIG. 1, which is a flowchart of a VR image processing method according to an embodiment of the present disclosure. The method includes the following steps S101 to 106.

In step S101, a left-eye viewpoint region is rendered based on a left-eye view angle, to obtain a left-eye viewpoint image.

In step S102, a right-eye viewpoint region is rendered based on a right-eye view angle, to obtain a right-eye viewpoint image.

The left-eye view angle refers to an angle covered by a sight from the left eye and may basically indicate a position of the left eye. The right-eye view angle refers to an angle covered by a sight from the right eye and may basically indicate a position of the right eye. Each of the left eye and the right eye is capable of seeing an object within a certain angle range, thus the word "view angle" is used. A left-eye viewpoint is a fixation point of a visual field within the left-eye view angle, and is always the center of the visual field within the left-eye view angle. A right-eye viewpoint is a fixation point of a visual field within the right-eye view angle, and is usually the center of the visual field within the right-eye view angle. Therefore, a region near a viewpoint and centered on the viewpoint in a complete visual field is referred to as a viewpoint region.

Therefore, steps S101 and S102 are performed respectively for the left eye and the right eye, so as to render the left-eye viewpoint region based on the left-eye view angle and render the right-eye viewpoint region based on the right-eye view angle, to obtain the left-eye viewpoint image and the right-eye viewpoint image. Regardless of whether the left eye or the right eye, the viewpoint region includes an object that a user most want to see clearly and is also the most important part to bring the user VR image viewing experience, therefore the viewpoint region is usually rendered with a high-resolution standard to provide the user with the best viewing experience. In the present disclosure, the left-eye viewpoint region and the right-eye viewpoint region are rendered separately to obtain the left-eye viewpoint image and the right-eye viewpoint image, which are still two groups of images.

In step S103, a candidate region is determined based on positions of the left-eye view angle and the right-eye view angle, and a point in the candidate region is selected as a peripheral image view angle.

Figure 2:
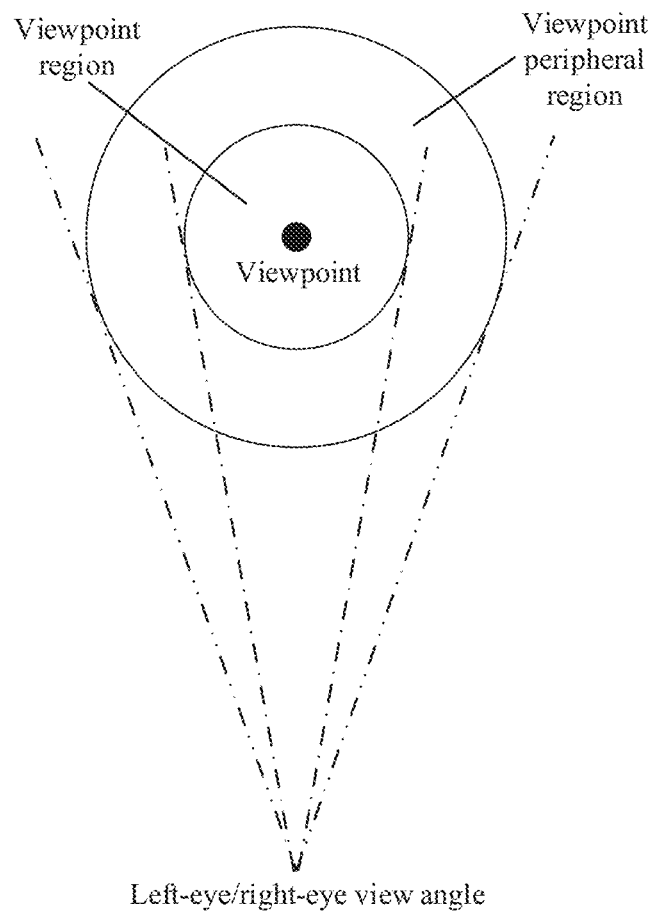
FIG. 2 is a positional schematic diagram of a viewpoint region and a viewpoint peripheral region according to an embodiment of the present disclosure.
Figure 3:
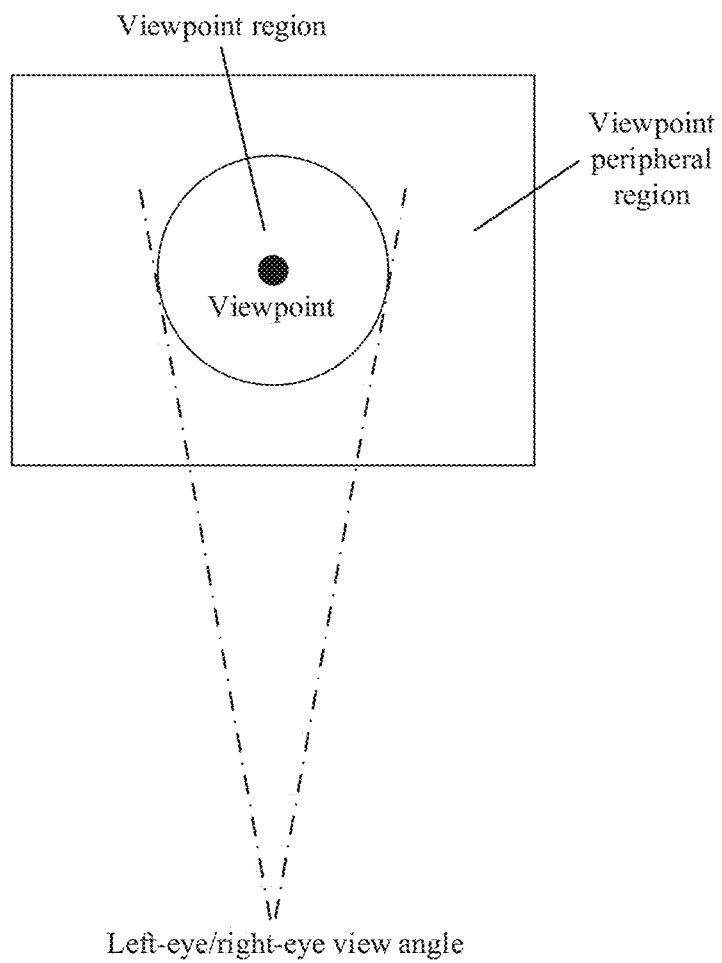
FIG. 3 is a positional schematic diagram of a viewpoint region and a viewpoint peripheral region according to another embodiment of the present disclosure.

Viewpoint region images have been rendered in steps S101 and S102. A region except the viewpoint region in a complete visual field is usually referred to as a viewpoint peripheral region. FIG. 2 and FIG. 3 are schematic diagrams each showing a viewpoint region and a viewpoint peripheral region provided based on a shape of a complete visual field. Compared with the viewpoint region images which are mainly used for creating a stereoscopic effect and improving a viewing effect, peripheral viewpoint images corresponding to the viewpoint peripheral regions have little effect on the creation of the stereoscopic effect and the improvement of the viewing effect. In most cases, the peripheral viewpoint images are just used for filling the rest of the complete visual field and serve as a background.

Therefore, in view of the above, the way of rendering a left-eye viewpoint peripheral region based on the left-eye view angle to obtain a left-eye viewpoint peripheral image and rendering a right-eye viewpoint peripheral region based on the right-eye view angle to obtain a right-eye viewpoint peripheral image in the conventional technology will not be applied in the present disclosure. While in the present disclosure, a unique peripheral image view angle is selected in an appropriate manner, and the left-eye viewpoint peripheral region and the right-eye viewpoint peripheral region are rendered based on the unique peripheral image view angle to obtain a same viewpoint peripheral image, so as to reduce the amount of data that is required to be rendered.

Though unlike the conventional technology in which the left-eye view angle and the right-eye view angle serve as transition image view angles, in order to avoid a big difference between a part of the left-eye image in the left-eye viewpoint peripheral region and a part of the right-eye image in the right-eye viewpoint peripheral region which may seriously affects the viewing experience, in step S103, a suitable candidate region is determined based on positions of the left-eye view angle and the right-eye view angle and any one of points in the candidate region is selected as the peripheral image view angle. That is, the peripheral image view angle is not selected randomly, but is selected based on positions of the left-eye view angle and the right-eye view angle. The selected position will not have much impact on the viewing experience but can reduce the amount of data required to be rendered.

Figure 4:
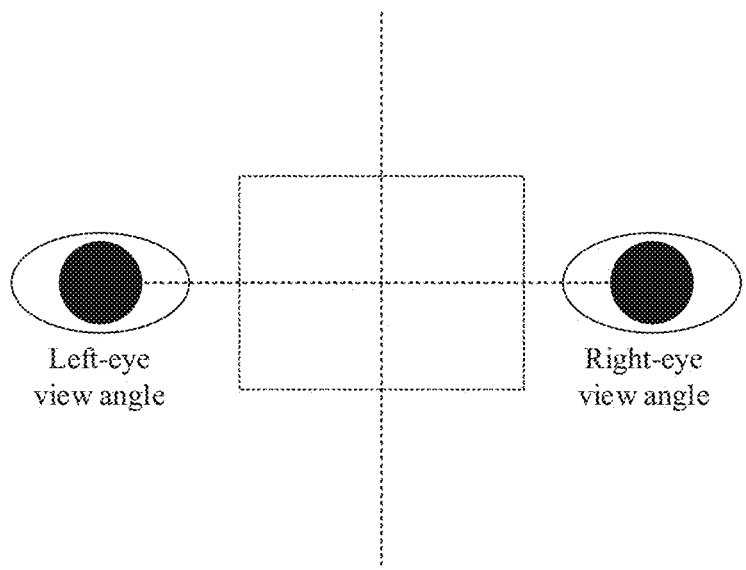
FIG. 4 is a positional schematic diagram of a rectangular candidate region in a VR image processing method according to an embodiment of the present disclosure.
Figure 5:
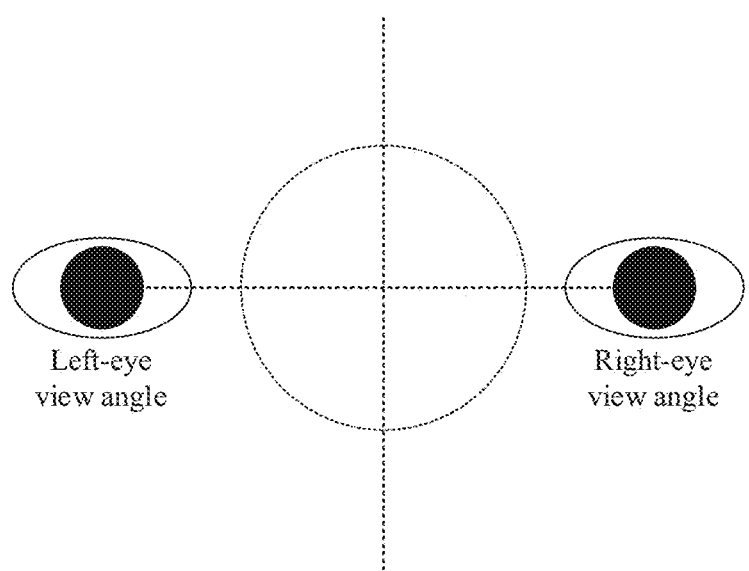
FIG. 5 is a positional schematic diagram of a circular candidate region in a VR image processing method according to an embodiment of the present disclosure.

In order to describe how to realize the objectives of the present disclosure by the candidate region, two appropriate expressions of the candidate region are provided in FIG. 4 and FIG. 5 of the present disclosure.

As show in FIG. 4, the candidate region is a rectangular region located between the left-eye view angle and the right-eye view angle. An upper boundary and a lower boundary of the rectangle are parallel to a straight line connecting the left-eye view angle and the right-eye view angle, and there is a distance between the straight line and each of the upper boundary and the lower boundary. A left boundary of the rectangle connects a left end of the upper boundary and a left end of the lower boundary, and a right boundary of the rectangle connects a right end of the upper boundary and a right end of the lower boundary. An intersection of diagonals of the rectangle is a central point of the straight line. In brief, the rectangular candidate region shown in FIG. 4 has included points on the straight line, and points on all lines in parallel to the straight line and within a certain distance from the straight line. It is sure that any one of these points is at a region between the left-eye view angle and the right-eye view angle. Therefore, based on this feature, the any one of these points in the rectangular candidate region may be served as the peripheral image view angle, so that the viewpoint peripheral image corresponding to the peripheral image view angle can have included both of a part of the left-eye image and a part of the right-eye image, and thus the viewpoint peripheral image obtained by rendering will not seriously affect the viewing experience.

Similarly, FIG. 5 shows a circular candidate region having the same feature described above, which is obtained by making a circle centered as a midpoint of the straight line connecting the left-eye view angle and the right-eye view angle. The circular candidate region may be obtained by the following steps. The left-eye view angle and the right-eye view angle are connected through a straight line, and a circle is made with a preset radius and centered as a midpoint of the straight line, to obtain the circular candidate region. The preset radius is not greater than half of the length of the straight line.

Figure 6:
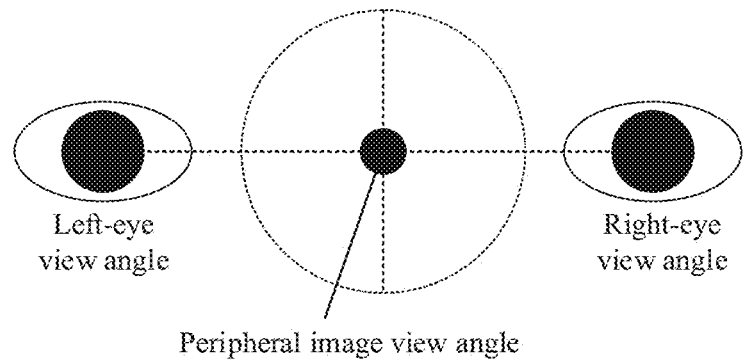
FIG. 6 is a positional schematic diagram of a peripheral image view angle selected from the candidate region shown in FIG. 5 according to an embodiment of the present disclosure.

After the circular candidate region shown in FIG. 5 is obtained by performing the above steps, in selecting the peripheral image view angle, the center of the circle may be preferably selected as a preferred peripheral image view angle as shown in FIG. 6, since the preferred peripheral image view angle, compared with other points in the circular candidate region, is at a same horizontal height as the left-eye view angle and the right-eye view angle, there exists no difference in image content caused by a height difference.

Moreover, the preferred peripheral image view angle is located at the midpoint of the straight line connecting the left-eye view angle and the right-eye view angle, thus a proportion of the left-eye image included in the image content is equal to a proportion of the right-eye image included in the image content, which will better balance a difference between the left-eye image and the right-eye image with minimal impact on the viewing experience.

In step S104, the left-eye viewpoint peripheral region and the right-eye viewpoint peripheral region are rendered based on the peripheral image view angle, to obtain a same viewpoint peripheral image.

Based on step S103, step S104 aims to render the left-eye viewpoint peripheral region and the right-eye viewpoint peripheral region based on the peripheral image view angle to obtain a same viewpoint peripheral image. In brief, compared with the conventional technology, a unique peripheral image view angle is determined in the present disclosure, and thus a same viewpoint peripheral image is obtained by rendering the left-eye viewpoint peripheral region and the right-eye viewpoint peripheral region. Since it is not required to render the left-eye viewpoint peripheral region based on the left-eye view angle and render the right-eye viewpoint peripheral region based on the right-eye view angle to obtain two different groups of viewpoint peripheral images, the amount of data that is required to be rendered can be effectively reduced with the above solutions of the present disclosure. In addition, due to the position of the viewpoint peripheral image in the complete visual field, the viewpoint peripheral image has little influence on the creation of the stereoscopic effect and the improvement of viewing experience. Therefore, the solutions according to the present disclosure hardly affect the VR viewing experience of the user.

In step S105, the viewpoint peripheral image is spliced with the left-eye viewpoint image to obtain a left-eye complete image, and the viewpoint peripheral image is spliced with the right-eye viewpoint image to obtain a right-eye complete image.

Based on step S104, in step S105, the same viewpoint peripheral image is spliced with the left-eye viewpoint image and with the right-eye viewpoint image, so as to obtain the left-eye complete image and the right-eye complete image.

It can be seen from the above technical solutions that, in the embodiment of the present disclosure, a unique peripheral image view angle is determined for viewpoint peripheral regions based on a left-eye viewpoint and a right-eye viewpoint, and a unique group of viewpoint peripheral images is obtained by rendering based on the peripheral image view angle. That is, the left-eye complete image and the right-eye complete image are obtained by splicing different viewpoint images with the same viewpoint peripheral image respectively. Images of the viewpoint peripheral regions are relatively far from the viewpoints, thus the difference of the images of the viewpoint peripheral regions in size hardly affects the creating of stereoscopic effect, and thus hardly affects VR viewing experience of the user. Therefore, the amount of data that is required to be rendered can be significantly reduced without affecting the VR viewing experience, thereby shortening the time delay, improving the frame rate and relieving the vertiginous sensation.

It should be understood that, when the user is viewing a VR image with VR glasses, the head of the user may inevitably move, and thus it may be determined whether the user is currently in a moving state based on the displacement of the left-eye viewpoint (or, the right-eye viewpoint) within a certain time period. Once it is determined that the user is currently in a static state based on the displacement, it indicates that the user has focused on the viewpoint content to a high extent. In this state, it may be reduced the area of the viewpoint region and increased the area of the viewpoint peripheral region in a proper manner, to further reduce the amount of data that is required to be rendered.

Further, the unique peripheral image view angle is selected in the present disclosure, so that only one group of viewpoint peripheral images is obtained by rendering, thereby reducing the amount of data that is required to be rendered. Therefore, even if the viewpoint peripheral image is rendered at a high resolution as the same as that used in rendering the viewpoint images, the amount of data that is required to be rendered can be reduced effectively compared with the solution in the conventional technology in which two groups of images are required to be rendered. Apparently, in the present disclosure, the amount of data that is required to be rendered may be further reduced by decreasing the resolution of the viewpoint peripheral image at a basis of the above solution.

No matter whether the viewpoint peripheral image is rendered at a high resolution, a medium resolution or a low resolution, due to the selection manner of the peripheral image viewpoint, there is a little sense of stripping or splitting between the viewpoint part and the viewpoint peripheral part that form the complete image, which is caused by different view angles, and thus views and contents seen from different view angles are different. The sense of stripping or splitting will become obvious as the viewpoint peripheral image goes from high to low. Therefore, in order to eliminate as much as possible the obvious sense of stripping or splitting caused by a medium resolution and a low resolution of the viewpoint peripheral image, a solution in which a transition region is added between the viewpoint region and the viewpoint peripheral region is further provided according to the present disclosure.

Figure 7:
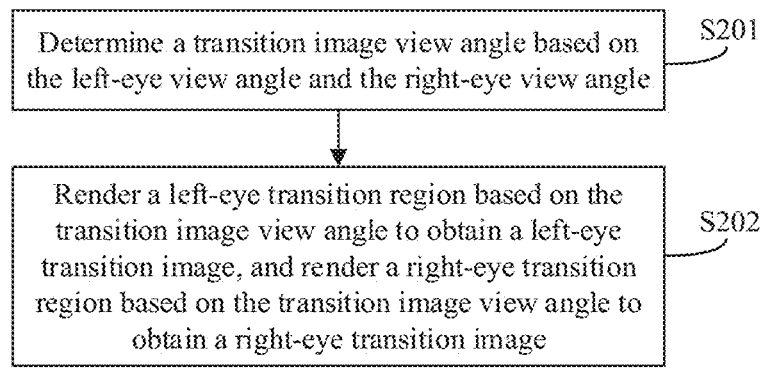
FIG. 7 is a flowchart of setting a transition region and rendering the transition region to obtain a transition image according to an embodiment of the present disclosure.

An implementation may be made with reference to a flowchart shown in FIG. 7, which is not limited thereto. The implementation includes the following steps S201 to S202.

In step S201, a transition image view angle is determined based on the left-eye view angle and the right-eye view angle.

In step S202, a left-eye transition region is rendered based on the transition image view angle to obtain a left-eye transition image, and a right-eye transition region is rendered based on the transition image view angle to obtain a right-eye transition image.

The left-eye transition region surrounds an outer boundary of the left-eye viewpoint region, and the left-eye viewpoint peripheral region surrounds an outer boundary of the left-eye transition region. The right-eye transition region surrounds an outer boundary of the right-eye viewpoint region, and the right-eye viewpoint peripheral region surrounds an outer boundary of the right-eye transition region.

Figure 8:
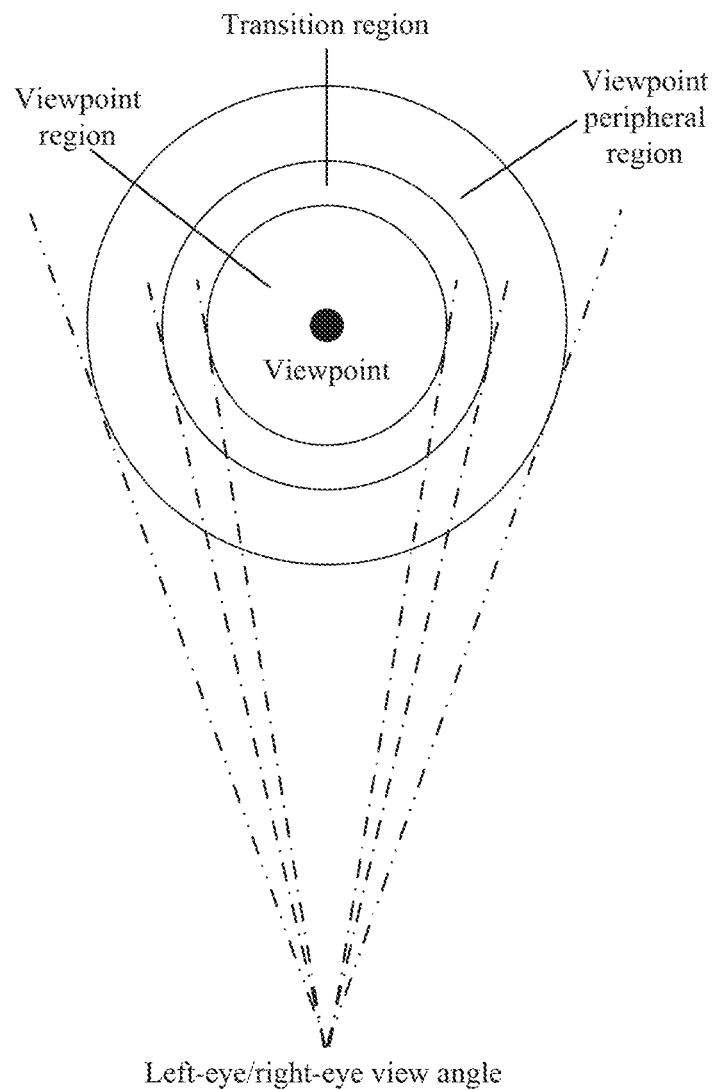
FIG. 8 is a positional schematic diagram of a viewpoint region, a transition region and a viewpoint peripheral region according to an embodiment of the present disclosure.

In a case that the transition regions are added, the schematic diagram shown in FIG. 2 may be updated to the schematic diagram shown in FIG. 8. It should be noted that the transition region functions for connecting a viewpoint image and a viewpoint peripheral image that are with different view angles, and thus a resolution of the left-eye transition image is lower than a resolution of the left-eye viewpoint image and higher than a resolution of the left-eye viewpoint peripheral image, and a resolution of the right-eye transition image is lower than a resolution of the right-eye viewpoint image and higher than a resolution of the right-eye viewpoint peripheral image.

In the following, a detailed discussion will be given on how to determine the transition image view angle according to the left-eye view angle and the right-eye view angle.

Figure 9:
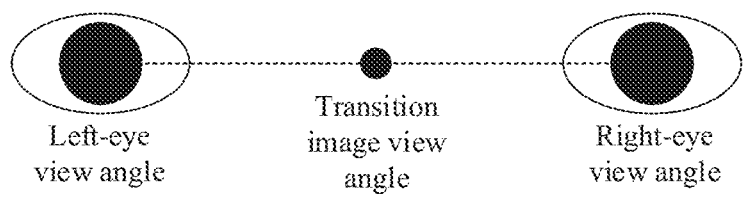
FIG. 9 is a positional schematic diagram of a transition image view angle according to an embodiment of the present disclosure.

In a first implementation, similar to the peripheral image view angle, a unique transition image view angle is selected. The selection of the transition image view angle in this implementation may be made with reference to the description of determining the unique peripheral image view angle based on the left-eye view angle and the right-eye view angle. Moreover, in order to function for connecting the viewpoint image and the viewpoint peripheral image that are with different view angles, it is required that the resolution of the transition image is higher than the resolution of the viewpoint peripheral image. Further, due to difference in view angles, it is also required to perform an optimization processing on a splice of different regions with an image processing method such as a weight change method or a feature point fitting method, to facilitate better connection. A preferred manner may be made with reference to the schematic diagram shown in FIG. 9, in which, a midpoint of a straight line connecting the left-eye view angle and the right-eye view angle is selected as the unique transition image view angle, that is, the left-eye transition image view angle and the right-eye transition image view angle are in the same position.

The weight change method and the feature point fitting method are used for solving the problem of a sudden change of an image in the transition region. It is required to perform an overlapping fitting processing on a junction of the viewpoint region and the transition region and on a junction of the transition region and the viewpoint peripheral region, so as to reduce display anomaly caused by the sudden change of the image as much as possible. That is, a rendering range of the transition region is required to overlap a rendering range of the viewpoint region, and is also required to overlap a rendering range of the viewpoint peripheral region, so as to perform fitting on overlapping regions to obtain final images of the overlapping regions.

The weight change method is performed by the following steps to realize the above objective.

An image parameter of each pixel of an image in the transition region is calculated according to the following equation:

$$A = W*x + G*(1-x),$$

where A represents any one of pixels in the image of the transition region, W represents the viewpoint peripheral image, G represents the image of the transition region, x represents a weight and gradually changes from 1 to 0 with an increase of a distance between A and an inner edge of the transition region.

The idea of the weight change method is described as following. From the inner edge of the transition region to the outer edge of the transition region, a weight (a floating point value) gradually changes from 1 to 0 for an image rendered by using a transition region parameter, and a weight (a floating point value) gradually changes from 0 to 1 for an image rendered by using a viewpoint peripheral region parameter. The two images are synthesized through floating-point operation, and the two images are fitted together as an image actually displayed in the transition region.

The feature point fitting method is performed by the following steps to realize the above objective.

A splicing overlapping region of the viewpoint image and the transition image is determined. A part of the viewpoint image located in the splicing overlapping region is selected as a standard image, and a part of the transition image located in the splicing overlapping region is selected as a transformation image. A matching feature point between the standard image and the transformation image is extracted. The transformation image is adjusted based on the matching feature point, so that the adjusted transformation image has more matching feature points with the standard image.

The idea of the feature point fitting method is described as following. An image is selected as the standard image. In this example, the viewpoint image is selected as the standard image. Another image is selected as the transformation image. The standard image and the transformation image are preprocessed (such as histogram, binarization, and filtering) first, and then feature scanning and extraction (such as edge detection and grayscale detection) are performed. The feature points may be determined based on a corner, an edge and a contour. After the feature points are determined, a matching detection is performed on the feature points of the two images. For feature points that can be matched, positions of these matched feature points are determined and kept unchanged. Image synthesis is performed through image rotation, interpolation and other operations, such that more feature points of the two images can be overlapped. That is, more feature points are matched after the adjustment.

In a second implementation, unlike the selection of the peripheral image viewpoint, in this example, a left-eye transition image view angle much closer to the left-eye viewpoint is selected for the left-eye transition region, and a right-eye transition image view angle much closer to the right-eye viewpoint is selected for the right-eye transition region. In this implementation, the selected transition image view angles are respectively close to the left-eye viewpoint and the right-eye viewpoint as far as possible, thus it is not required to perform overlapping fitting processing as in the first implementation. It may be understood that in order to eliminate extra computations caused by the overlapping fitting processing, the second implementation adopts the solution of making the transition image view angles much closer to the left-eye view angle and the right-eye view angle respectively, so as to eliminate a sudden change of an image caused by the difference in view angles of images at different regions as much as possible.

In an example, the left-eye view angle directly serves as the left-eye transition image view angle, and the right-eye view angle directly serves as the right-eye transition image view angle. That is, the view angle of the transition region is the same as the view angle of the viewpoint region, which is equivalent to that the transition region fully serves as an extension of the viewpoint region. Thus in this solution, the problem is solved as much as possible by increasing an area of the viewpoint region. However, in this solution, the amount of data required to be rendered is increased compared with the initial solution, which is contrary to the main objective of the present disclosure. Therefore, another solution is provided according to the present disclosure, and reference may be made to the flowchart shown in FIG. 10 and the schematic diagram shown in FIG. 11 corresponding to the solution shown in FIG. 10.

In step S301, a midpoint of a straight line connecting the left-eye view angle and the right-eye view angle is determined as a central view angle.

In step S302, a midpoint of the left-eye view angle and the central view angle is determined as a left-eye transition image view angle.

In step S303, a midpoint of the right-eye view angle and the central view angle is determined as a right-eye transition image view angle.

Figure 10:
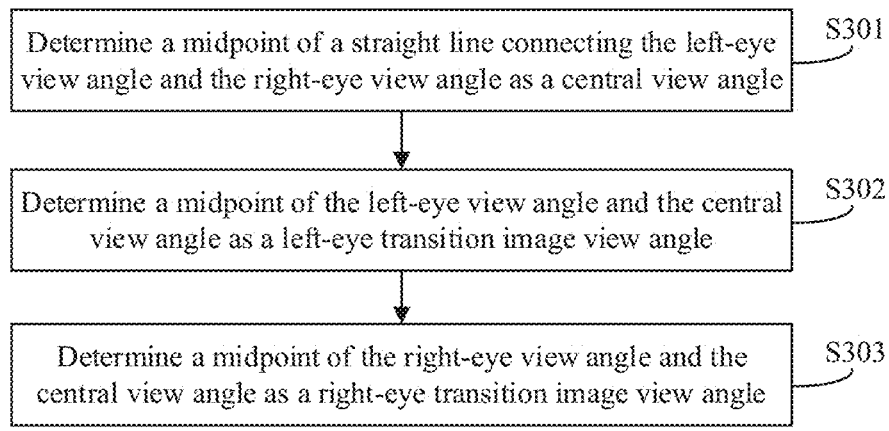
FIG. 10 is a flowchart of a method for determining a transition image view angle according to an embodiment of the present disclosure.
Figure 11:
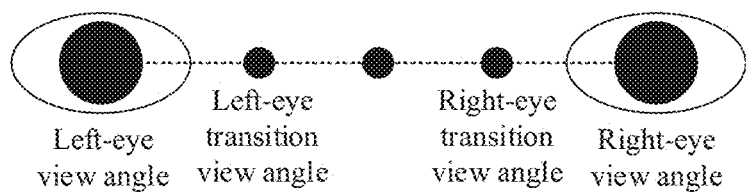
FIG. 11 is a positional schematic diagram of a transition image view angle determined with the method shown in FIG. 10 according to an embodiment of the present disclosure.
Figure 12:
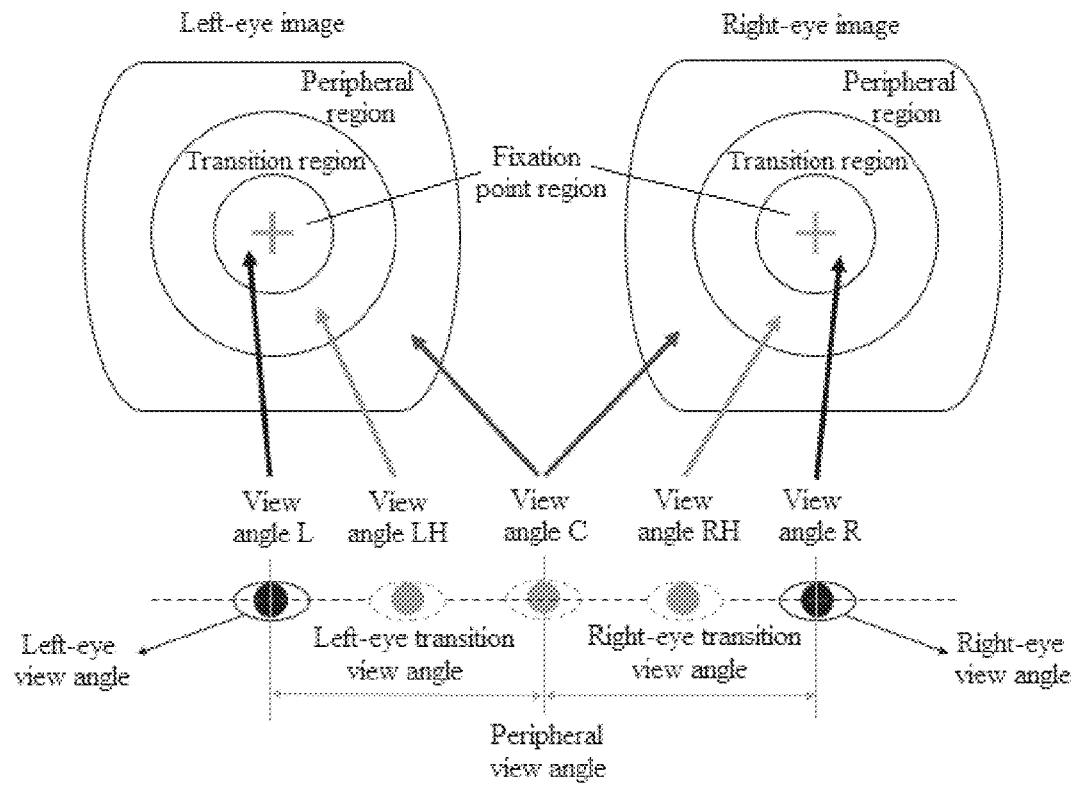
FIG. 12 is a specific schematic diagram of view angles and imaging regions according to an embodiment of the present disclosure.

The selection of the transition image view angle shown in FIG. 10, is neither directly selecting the left-eye view angle and the right-eye view angle as the left-eye transition image view angle and the right-eye transition image view angle respectively, nor directly selecting the midpoint of the left-eye view angle and the right-eye view angle as a unique transition image view angle, but is a further compromise. That is, the midpoint of the left-eye view angle and the central view angle is determined as the left-eye transition image view angle, and the midpoint of the right-eye view angle and the central view angle is determined as the right-eye transition image view angle. Through the above operations, the left-eye transition image view angle can be much closer to the left-eye view angle, and the right-eye transition image view angle can be much closer to the right-eye view angle. In addition, a sudden change of an image caused by the difference of view angles can be reduced, and an extra computation caused by performing overlapping fitting processing on images can be reduced. A schematic diagram of this solution may be made with reference to FIG. 12.

Accordingly, in a case that the transition regions are added, in determining whether the head of the user is in a moving state based on the displacement, the region an area of which needs to be reduced may be changed from the viewpoint region to the transmission region if it is determined that the head of the user is in a static state, so as to guarantee viewing experience brought by images of the viewpoint region to the user with reducing the amount of the data required to be rendered.

The situations are complex and cannot be completely enumerated. Those skilled in the art should be aware that many examples may be obtained by combining the basic method and principle provided in the present disclosure with actual situations without enough creative effort and the examples should be within the protection scope of the present disclosure.

Figure 13:
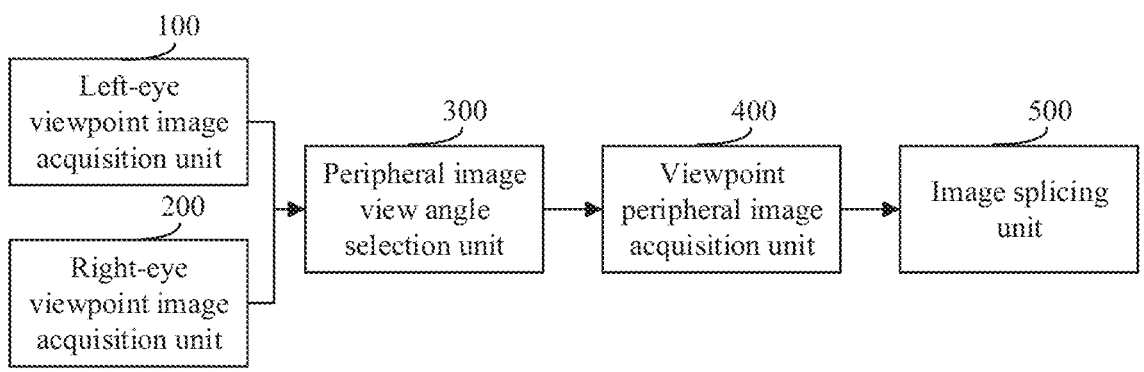
FIG. 13 is a structural block diagram of a VR image processing device according to an embodiment of the present disclosure.

Reference is made to FIG. 13, which is a structural block diagram of a VR image processing device according to an embodiment of the present disclosure. The device may include a left-eye viewpoint image acquisition unit 100, a right-eye viewpoint image acquisition unit 200, a peripheral image view angle selection unit 300, a viewpoint peripheral image acquisition unit 400, an image splicing unit 500, and an area adjustment unit 600.

The left-eye viewpoint image acquisition unit 100 is configured to render a left-eye viewpoint region based on a left-eye view angle, to obtain a left-eye viewpoint image.

The right-eye viewpoint image acquisition unit 200 is configured to render a right-eye viewpoint region based on a right-eye view angle, to obtain a right-eye viewpoint image.

The peripheral image view angle selection unit 300 is configured to determine a candidate region based on positions of the left-eye view angle and the right-eye view angle, and select a point in the candidate region as a peripheral image view angle.

The viewpoint peripheral image acquisition unit 400 is configured to render a left-eye viewpoint peripheral region and a right-eye viewpoint peripheral region based on the peripheral image view angle, to obtain a same viewpoint peripheral image.

The image splicing unit 500 is configured to splice the viewpoint peripheral image with the left-eye viewpoint image to obtain a left-eye complete image, and splice the viewpoint peripheral image with the right-eye viewpoint image to obtain a right-eye complete image.

In an embodiment, the peripheral image view angle selection unit 300 may include a connection subunit and an image candidate region acquisition subunit.

The connection subunit is configured to make a straight line to connect the left-eye view angle and the right-eye view angle.

The image candidate region acquisition subunit is configured to make a circle with a preset radius and centered as a midpoint of the straight line as the center of the circle, to obtain a circular candidate region. The preset radius is not greater than half of the length of the straight line.

In an embodiment, the peripheral image view angle selection unit 300 may include a peripheral image view angle preferred-selection subunit.

The peripheral image view angle preferred-selection subunit is configured to determine, when the candidate region is a circular candidate region, a center of the circular candidate region as the peripheral image view angle.

In an embodiment, the VR image processing device may further include a transition image view angle determination unit and a transition image rendering unit.

The transition image view angle determination unit is configured to determine a transition image view angle based on the left-eye view angle and the right-eye view angle.

The transition image rendering unit is configured to render a left-eye transition region based on the transition image view angle to obtain a left-eye transition image, and render a right-eye transition region based on the transition image view angle to obtain a right-eye transition image. The left-eye transition region surrounds an outer boundary of the left-eye viewpoint region, and the left-eye viewpoint peripheral region surrounds an outer boundary of the left-eye transition region. The right-eye transition region surrounds an outer boundary of the right-eye viewpoint region, and the right-eye viewpoint peripheral region surrounds an outer boundary of the right-eye transition region. A resolution of the left-eye transition image is lower than a resolution of the left-eye viewpoint image and is higher than a resolution of the left-eye viewpoint peripheral image. A resolution of the right-eye transition image is lower than a resolution of the right-eye viewpoint image and is higher than a resolution of the right-eye viewpoint peripheral image.

In an embodiment, the transition image viewpoint determination unit may include a central view angle determination subunit, a first left-eye transition image view angle determination subunit, and a first right-eye transition image view angle determination subunit.

The central view angle determination subunit is configured to determine a midpoint of a straight line connecting the left-eye view angle and the right-eye view angle as a central view angle.

The first left-eye transition image view angle determination subunit is configured to determine a midpoint of the left-eye view angle and the central view angle as a first left-eye transition image view angle.

The first right-eye transition image view angle determination subunit is configured to determine a midpoint of the right-eye view angle and the central view angle as a first right-eye transition image view angle.

In an embodiment, the transition image view angle determination unit may include a second left-eye transition image viewpoint and second right-eye transition image viewpoint determination subunit.

The second left-eye transition image viewpoint and second right-eye transition image viewpoint determination subunit is configured to determine the midpoint of the straight line connecting the left-eye view angle and the right-eye view angle as a second left-eye transition image view angle and also as a second right-eye transition image view angle.

In an embodiment, the VR image processing device further includes an image optimization processing unit.

The image optimization processing unit is configured to perform image optimization processing on a splice of images of different regions with a weight change method or a feature point fitting method.

In an embodiment, the image optimization processing unit includes a weight change method processing subunit. The weight change method processing subunit includes an equation calculation module.

The equation calculation module is configured to calculate an image parameter of each pixel of an image in an transition region according the following equation:

$$A = W*x + G*(1-x),$$

where A represents any one of pixels of an image in a transition region, W represents the viewpoint peripheral image, G represents the image of the transition region, x represents a weight and gradually changes from 1 to 0 with an increase of a distance between A and an inner edge of the transition region.

In an embodiment, the image optimization processing unit includes a feature point fitting method processing subunit. The feature point fitting method processing subunit includes a splicing overlapping region determination module, a standard image selection module, a transformation image selection module, a matching feature point extraction module, and a matching feature point-based adjustment module.

The splicing overlapping region determination module is configured to determine a splicing overlapping region of the viewpoint image and the transition image.

The standard image selection module is configured to select a part of the viewpoint image located in the splicing overlapping region as a standard image.

The transformation image selection module is configured to select a part of the transition image located in the splicing overlapping region as a transformation image.

The matching feature point extraction module is configured to extract a matching feature point between the standard image and the transformation image.

The matching feature point-based adjustment module is configured to adjust the transformation image based on the matching feature point, so that the adjusted transformation image has more matching feature points with the standard image.

The embodiment is a device embodiment corresponding to the above method embodiment. The device embodiment has all the beneficial effects of the method embodiment, which will not be repeated herein.

Based on the above embodiments, VR glasses are further provided according to the present disclosure. The VR glasses may include a memory and a processor. The memory is configured to store a computer program. The processor is configured to call the computer program stored in the memory to perform the steps of the VR image processing method as described in the above embodiment. Apparently, the VR glasses may further include various necessary network interfaces, power supplies and other components.

A readable storage medium is further provided according to the present disclosure. The readable storage medium stores a computer program that, when being executed by an execution terminal or a processor, performs the steps of the VR image processing method according to the above embodiment. The storage medium may include various media that can store program codes, such as a USB flash disk, a mobile hard disk, a Read-Only Memory (ROM), a Random Access Memory (RAM), a disk, or an optical disc.

The embodiments in the specification are described in a progressive way, each of which emphasizes differences from others, and for the same or similar parts among the embodiments, reference may be made to each other. Since the device disclosed in the embodiments corresponds to the method disclosed herein, the description of the device is relatively simple, and for relevant matters, reference may be made to the description of the method embodiments.

It is further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above with regard to functions. Whether the functions are implemented by hardware or by software depends on specific applications and design constraints of the technical solutions. Those skilled in the art may use different methods for each particular application to implement the described functions, but such implementation should not be considered as going beyond the scope of the present disclosure.

Examples are used to explain the principle and the implementation of the present disclosure, and the above descriptions of the embodiments are only used for helping understand the method and the core idea of the present disclosure. For those skilled in the art, various improvements and modifications may be made to the present disclosure without departing from the principle of the present disclosure, and such improvements and modifications fall within the protection scope of the claims of the present disclosure.

It should be noted that in the specification, relational terms such as "first" and "second" are merely for distinguishing one entity or operation from another entity or operation, and do not necessarily require or imply that there is an actual relationship or order between these entities or operations. Moreover, terms of "include", "comprise" or any other variants are intended to be non-exclusive, such that a process, a method, an article or a device including a series of elements includes not only these elements but also includes other elements that are not explicitly listed, or also includes elements inherent in the process, the method, the article or the device. Unless otherwise explicitly limited, the statement "comprising (including) a . . . " does not exclude the existence of other identical elements in the process, the method, the article or the device that includes the element.

The invention claimed is:

1. A VR image processing method, comprising:
    rendering a left-eye viewpoint region based on a left-eye view angle, to obtain a left-eye viewpoint image;
    rendering a right-eye viewpoint region based on a right-eye view angle, to obtain a right-eye viewpoint image;
    determining a candidate region based on positions of the left-eye view angle and the right-eye view angle, and selecting a point in the candidate region as a peripheral image view angle;
    rendering a left-eye viewpoint peripheral region and a right-eye viewpoint peripheral region based on the peripheral image view angle, to obtain a same viewpoint peripheral image; and
    splicing the viewpoint peripheral image with the left-eye viewpoint image to obtain a left-eye complete image, and splicing the viewpoint peripheral image with the right-eye viewpoint image to obtain a right-eye complete image;
    determining whether a user is currently in a moving state based on displacements of the left-eye viewpoint and the right-eye viewpoint within a certain time period; and
    in response to that the user is currently in a static state based on the displacements, reducing an area of the left-eye viewpoint region and an area of the right-eye viewpoint region and increasing an area of the left-eye viewpoint peripheral region and an area of the right-eye viewpoint peripheral region.

2. The VR image processing method according to claim 1, wherein the determining a candidate region based on positions of the left-eye view angle and the right-eye view angle comprises:
    connecting the left-eye view angle and the right-eye view angle through a straight line; and
    making a circle centered as a midpoint of the straight line and having a preset radius, to obtain a circular candidate region, wherein the preset radius is not greater than half of a length of the straight line.

3. The VR image processing method according to claim 2, wherein in a case that the candidate region is the circular candidate region, the selecting a point in the candidate region as a peripheral image view angle comprises:
    determining a center of the circular candidate region as the peripheral image view angle.

4. The VR image processing method according to claim 1, wherein a resolution of the viewpoint peripheral image is lower than a resolution of the left-eye viewpoint image and is lower than a resolution of the right-eye viewpoint image.

5. The VR image processing method according to claim 1, further comprising:
    determining a transition image view angle based on the left-eye view angle and the right-eye view angle; and
    rendering a left-eye transition region based on the transition image view angle to obtain a left-eye transition image, and rendering a right-eye transition region based on the transition image view angle to obtain a right-eye transition image,
    wherein the left-eye transition region surrounds an outer boundary of the left-eye viewpoint region, and the left-eye viewpoint peripheral region surrounds an outer boundary of the left-eye transition region;
    the right-eye transition region surrounds an outer boundary of the right-eye viewpoint region, and the right-eye viewpoint peripheral region surrounds an outer boundary of the right-eye transition region;
    a resolution of the left-eye transition image is lower than a resolution of the left-eye viewpoint image and is higher than a resolution of the left-eye viewpoint peripheral image, and a resolution of the right-eye transition image is lower than a resolution of the right-eye viewpoint image and is higher than a resolution of the right-eye viewpoint peripheral image.

6. The VR image processing method according to claim 5, wherein the determining a transition image view angle based on the left-eye view angle and the right-eye view angle comprises:
- determining a midpoint of a straight line connecting the left-eye view angle and the right-eye view angle as a central view angle;
- determining a midpoint of the left-eye view angle and the central view angle as a first left-eye transition image view angle; and
- determining a midpoint of the right-eye view angle and the central view angle as a first right-eye transition image view angle.

7. The VR image processing method according to claim 5, wherein the determining a transition image view angle based on the left-eye view angle and the right-eye view angle comprises:
- determining a midpoint of a straight line connecting the left-eye view angle and the right-eye view angle as a second left-eye transition image view angle and as a second right-eye transition image view angle.

8. The VR image processing method according to claim 7, further comprising:
- performing image optimization processing on a splice of images of different regions with a weight change method or a feature point fitting method.

9. The VR image processing method according to claim 8, wherein the performing image optimization processing on a splice of images of different regions with a weight change method comprises:
- for each of the left-eye transition region and the right-eye transition region,
- calculating an image parameter of each pixel of an image of the corresponding transition region according to the following equation:

$$A = W*x + G*(1-x),$$

wherein A represents any one of pixels of the image of the transition region, W represents the viewpoint peripheral image, G represents the image of the transition region, x represents a weight and gradually changes from 1 to 0 with an increase of a distance between A and an inner edge of the transition region.

10. The VR image processing method according to claim 8, wherein the performing image optimization processing on a splice of images of different regions with a feature point fitting method comprises:
- for each of the left-eye view-point image and the right-eye view-point image,
- determining a splicing overlapping region of the viewpoint image and the corresponding transition image;
- selecting, as a standard image, a part of the viewpoint image which is located in the splicing overlapping region;
- selecting, as a transformation image, a part of the transition image which is located in the splicing overlapping region;
- extracting a matching feature point between the standard image and the transformation image; and
- adjusting the transformation image based on the matching feature point, so that the adjusted transformation image has more matching feature points with the standard image.

11. A VR image processing device, comprising:
- a left-eye viewpoint image acquisition unit, configured to render a left-eye viewpoint region based on a left-eye view angle, to obtain a left-eye viewpoint image;
- a right-eye viewpoint image acquisition unit, configured to render a right-eye viewpoint region based on a right-eye view angle, to obtain a right-eye viewpoint image;
- a peripheral image view angle selection unit, configured to determine a candidate region based on positions of the left-eye view angle and the right-eye view angle, and select a point in the candidate region as a peripheral image view angle;
- a viewpoint peripheral image acquisition unit, configured to render a left-eye viewpoint peripheral region and a right-eye viewpoint peripheral region based on the peripheral image view angle, to obtain a same viewpoint peripheral image; and
- an image splicing unit, configured to splice the viewpoint peripheral image with the left-eye viewpoint image to obtain a left-eye complete image, and splice the viewpoint peripheral image with the right-eye viewpoint image to obtain a right-eye complete image;
- determining whether a user is currently in a moving state based on displacements of the left-eye viewpoint and the right-eye viewpoint within a certain time period; and
- in response to that the user is currently in a static state based on the displacements, reducing an area of the left-eye viewpoint region and an area of the right-eye viewpoint region and increasing an area of the left-eye viewpoint peripheral region and an area of the right-eye viewpoint peripheral region.

12. VR glasses, comprising:
- a memory, configured to store a computer program; and
- a processor, configured to execute the computer program to implement steps of the VR image processing method according to claim 1.

13. A readable storage medium storing a computer program that, when being called and executed by a processor, performs steps of the VR image processing method according to claim 1.

* * * * *